United States Patent Office 2,954,358
Patented Sept. 27, 1960

2,954,358

AQUEOUS DISPERSION CONTAINING ACRYLIC ACID COPOLYMER AND ALIPHATIC POLY-EPOXIDE

Melvin D. Hurwitz, Huntingdon Valley, Pa., assignor to Rohm & Haas Company, Philadelphia, Pa., a corporation of Delaware No Drawing. Filed Oct. 1, 1957, Ser. No. 687,376

11 Claims. (Cl. 260—29.6)

This invention relates to novel aqueous compositions of matter comprising a mixture of a water-soluble or readily water-dispersible aliphatic polyepoxide and a water-insoluble linear thermoplastic copolymer of (1) one to ten mole percent of an acid selected from the group consisting of acrylic acid and methacrylic acid, which acids may be defined generically by the formula

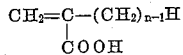

wherein $n$ is an integer having a value of 1 to 2, and (2) 90 to 99 mole percent of at least one alkyl ester of said acids. This invention further relates to surface coating compositions comprising a mixture of a polyepoxide and a copolymer as defined above dispersed in an aqueous medium. This application is a continuation-in-part of my copending application Serial No. 605,186, filed August 20, 1956, now abandoned.

One of the important characteristics of the compositions of the present invention is the fact that their vehicle is essentially aqueous and, because of this, they require no expensive solvents and solvent recovery systems and do not involve fire and health hazards to persons using the compositions. Still further, this invention relates to surface coating compositions which, on baking, yield hard, insoluble, compatible films which are characterized not only by good gloss and color but also by chemical and heat resistance. Another important characteristic of the compositions of the present invention is that the resinous film-forming constituents, namely the epoxide and the copolymer, contain no aromatic constituents and hence the films obtained are outstandingly resistant to discoloration and degradation on exposure to ultra-violet radiation so that the films and coatings are suitable for outdoor use. This invention further relates to novel compositions of matter which are particularly useful for making protective or decorative coatings, clear or pigmented, for paper, textiles, leather, rubber, wood, metals, and so on.

This invention further relates to surface coating compositions which comprise (A) 40 to 95 parts by weight of a linear thermoplastic copolymer of (1) 1 to 10 mole percent of acrylic acid or methacrylic acid, the copolymer being present either in the acid form or as a salt of ammonium hydroxide or of a water-soluble amine and (2) 90 to 99 mole percent of at least one alkyl ester of one of said acids and (B) 5 to 60 parts by weight of an aliphatic polyepoxide in an aqueous system. It is preferred but not essential that the amount of polyepoxide in the mixture is sufficient to provide substantially the same equivalent weight of epoxy as there is of carboxyl in the copolymer. The linear copolymer may be hereinafter referred to as component A and the polyepoxide as component B.

The copolymers, or their salts, of the acrylic acid or methacrylic acid may be any of those with at least one alkyl ester of one of the aforesaid acids in which the alkyl group contains from one to eighteen carbon atoms. For example, the esters may be derived from such alcohols as methanol, ethanol, propanol, isopropanol, n-butanol, isobutanol, t-butanol, pentanols, and hexanols, octanol, dodecanol, hexadecanol, or octadecanol. Of course, mixtures of such esters may be employed. When extremely hard coatings are desired, esters of methacrylic acid with the lower alcohols having from one to four carbon atoms are used exclusively or in predominant proportion of the ester component. The copolymers may be made by any conventional aqueous emulsion technique. The acid and ester comonomers may be mixed in the desired proportion before initiating polymerization and the entire amount of the monomers may be polymerized before one or more others is or are added subsequently during polymerization so as to produce block- or graft-copolymers rather than the normal heterogeneous or homogeneous types. It is only essential in accordance with the invention that the copolymer be a linear thermoplastic copolymer which is insoluble in water and contains either homogeneously-distributed or irregularly-distributed through the copolymer molecule one to ten mole percent of units containing carboxylic acid groups in free acid or salt form. The salt may be the ammonium salt or it may be the salt of any water-soluble monoamine, such as methylamine, dimethylamine, trimethylamine, mono-, di-, or triethylamine, mono-, di-, or triethanolamine, and the like.

Component B may consist of any water-soluble or easily water-dispersible aliphatic diglycidyl ether within the scope of Formula I hereinbelow, such as ethylene glycol diglycidyl ether, propylene glycol diglycidyl ether, and trimethylene glycol diglycidyl ether. Related water-soluble or readily water-dispersible glycidyl ethers that may be used are the polyglycidyl ethers of polyhydric alcohols having two to four carbon atoms, such as of ethylene glycol, glycerol, trimethylene glycol, propylene glycol, butylene glycols, their dimers, trimers, and higher polymers and especially the water-soluble or water-dispersible glycidyl ethers having the structure of one of Formulas I, II, and III.

I 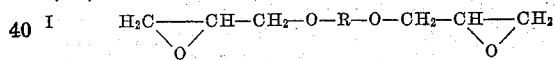

wherein R is an alkylene group of from two to six carbon atoms;

II 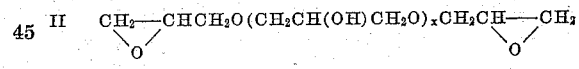

where $x$ is a number having an average value of one to three;

III 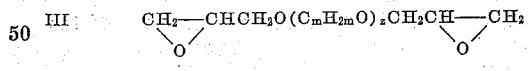

where $m$ is an integer having a value of two to four, and $z$ is a number having an average value of one to five. All of these polyepoxides contain at least two vic-epoxy groups in which the epoxy oxygen atom is attached to adjacent carbon atoms.

Preferred glycidyl ethers are those having molecular weights of about 250 to 1000. Since component B may be obtained by reactions involving condensation and elimination of water, they may all be termed "condensates," and for convenience of reference hereinafter are so termed.

Preferred epoxy condensates are those which are soluble in water but readily water-dispersible epoxy condensates may also be used. A dispersing agent such as an octylphenoxypolyethoxyethanol may be employed to aid in the dispersion of the latter type of condensates. Instead their solubility in aqueous systems may be improved sufficiently by the addition of a lower alcohol, such as ethanol, isopropanol, and the like.

The water-insoluble copolymer is maintained in dispersed condition in the aqeous medium by a dispersing agent which is generally the emulsifying agent, of anionic or non-ionic character, used for emulsifying the monomers in the emulsion polymerization system.

Examples of anionic emulsifiers that may be used include the ordinary soaps such as the alkali metal, ammonium and alkanolamine salts of fatty acids including sodium oleate, potassium palmitate, ammonium stearate ethanolamine laurate, and the like as well as rosin and dehydrated rosin acid soaps, and the synthetic saponaceous materials including the higher aliphatic sulfates and sulfonates such as sodium lauryl sulfate, sodium cetyl sulfate, the sodium salts of sulfonated paraffin oils, the sodium salts of dodecane-1-sulfonic acid, octadecane-1-sulfonic acid, etc., the alkaryl sulfonates such as the sodium alkyl aryl sulfonates such as sodium isopropyl benzene sulfonate, sodium isopropyl naphthalene sulfonate, the alkali metal salts of sulfonated dicarboxylic acid esters and amides such as sodium dioctyl sulfosuccinate, sodium N-octadecyl-sulfonsuccinamide, sulfonated or sulfated alkyl phenoxyethoxyethanols having from 1 to 50 oxyethylene units per molecule in which the alkyl has from 4 to 18 carbon atoms, such as hexyl, n-octyl, t-octyl, lauryl, hexadecyl, and octadecyl, and the like; suitable non-ionic emulsifying and dispersing agents include alkylphenoxypolyethoxyethanols having alkyl groups of about seven to eighteen carbon atoms and 6 to 60 or more oxyethylene units, such as heptylphenoxypolyethoxyethanols, octylphenoxypolyethoxyethanols, methyloctylphenoxypolyethoxyethanols, nonylphenoxypolyethoxyethanols, dodecylphenoxypolyethoxyethanols, and the like; polyethoxyethanol derivatives of methylene linked alkyl phenols; sulfur-containing agents such as those made by condensing 6 to 60 or more moles of ethylene oxide with nonyl, dodecyl, tetradecyl, t-dodecyl, and the like mercaptans or with alkylthiophenols having alkyl groups of six to fifteen carbon atoms; ethylene oxide derivatives of long-chained carboxylic acids, such as lauric, myristic, palmitic, oleic, and the like or mixtures of acids such as found in tall oil containing 6 to 60 oxyethylene units per molecule; analogous ethylene oxide condensates of long-chained alcohols, such as octyl, decyl, lauryl, or cetyl alcohols, ethylene oxide derivatives of etherified or esterified polyhydroxy compounds having a hydrophobic hydrocarbon chain, such as sorbitan monostearate containing 6 to 60 oxyethylene units, etc.; also ethylene oxide condensates of long-chain or branched-chain amines, such as dodecylamine, hexadecylamine, and octadecylamine, containing 6 to 60 oxyethylene groups, block copolymers of ethylene oxide and propylene oxide comprising a hydrophobic propylene oxide section combined with one or more hydrophilic ethylene oxide sections.

From ½% to 8% by weight of one or more of the above emulsifiers, based on the weight of monomers or polymer, may be present.

Besides the copolymer and polyepoxide, the aqueous system may contain a small amount of a catalyst for the reaction of the acid copolymer with the epoxide, preferably an aliphatic amine, such as any of the amines mentioned above that may be used to make salts of the acid copolymers, lutidines, collidines, pyridine, benzylamine, benzyldimethylamine, 1,8-diamino-p-menthane, and N-substituted derivatives thereof obtained by alkylation, such as N,N,N',N'-tetramethyl-1,8-diamino-p-menthane, and N,N'-dimethyl-1,8-diamino-p-menthane, or a polyalkylenepolyamine, including ethylenediamine, diethylenetriamine, triethylenetetraamine, etc. When the catalyst is used it may be used in an amount of about one mole percent or more based on the acid units of the copolymer.

Depending upon the particular method of application, the concentration of the composition may vary widely. For example, the dispersion of the copolymer and polyepoxide may contain from 1% up to about 50% by weight of the mixture of the copolymer and polyepoxide (solids). For coating purposes, the composition may be applied by spraying, dipping, brushing, roll-transfer, or in any other suitable manner.

After application of the composition to a surface, it may be allowed to dry by exposure to normal atmospheric air currents. Alternatively, it may be dried by application of heated air, by application of infrared rays, radio frequency currents, or in any other suitable manner. After drying or during drying, curing is effected by heating to a temperature of about 200° F. to 400° F. or higher for a period of time that generally is inversely proportional to the temperature and may be from about 30 seconds to an hour or so. The combined factors of temperature and time depend upon the particular substrate used and the thickness of coating.

The compositions may be pigmented if clear coatings are not desired. For this purpose, there may be incorporated into the composition an amount of pigment, extender, filler, delustrant, or the like, such that the weight ratio of binder solids (including the epoxide and copolymer) to pigment is from 20:1 to 1:20, depending upon the particular effect desired. For most purposes, the ratio of binder to pigment may be from 1:2 to 1:6. Any pigments which are not sensitive to the acid groups of the copolymer may be employed including titanium dioxide, copper phthalocyanine, ultramarine blue, zinc oxide, zinc sulfide, barium sulfate, calcium carbonate, zinc chromate, carbon black, and so on.

The acid groups in the copolymer provide several important functions in the composition. In the first place, they provide compatibility of the copolymer with the polyepoxide in the dried film or coating. The acid groups also provide a source of catalytic action for accelerating the conversion of the polyepoxide to insoluble and infusible condition during the curing action. Not only do the acid groups have a catalytic function during the curing but they also take part in the curing action by co-reacting with the polyepoxide. During such co-reaction, in the preferred compositions, the carboxyl groups are practically completely converted to non-corrosive derivatives. Thus, the copolymer takes part in the reaction by which the composition is rendered infusible and insoluble.

The epoxide groups in component B react with the carboxyl groups of the copolymer to effect cross-linking thereof to an insoluble and infusible condition.

The coatings may be applied to all sorts of surfaces for a wide variety of purposes. They are particularly desirable for application to the surface of metals, such as iron, steel, copper, brass, aluminum, chromium, nickel, and the like; to glass, porcelain and other vitreous materials; to articles made of plastic materials, such as polyesters, polymers of alkyl acrylates and methacrylates, such as of methyl methacrylate or copolymers thereof; wood, textile fabrics, leather, paper, cardboard, and so on.

The compositions of the present invention are adapted for the pigment-printing and -dyeing of textiles, for the permanent sizing or finishing of textile fabrics and papers either in pigmented or clear form and they are characterized by excellent adhesion to all sorts of substrates and especially to metals and glass, by good gloss, by hardness, by resistance to attack by solvents, resistance to heat, resistance to ultraviolet light, and they are characterized by good cohesion, compatibility, clarity, and strength.

The following examples are illustrative of the present invention:

*Example 1*

One hundred parts of 50% aqueous dispersion of an emulsion copolymer of 35 mole percent of methyl methacrylate, 55 mole percent of ethyl acrylate and 10 mole percent of methacrylic acid is mixed with 10 parts of a diglycidyl ether of Formula II above in which the average value of $x$ is about three. Panels of steel and glass are coated with the mixture and, after being dried, the coated panels are heated to 350° F. for forty minutes. The clear coatings obtained have a Knoop hardness of 5 and are resistant to water, alcohol, and ethoxyethyl acetate.

*Example 2*

The procedure of Example 1 is repeated except that the copolymer is replaced with an emulsion copolymer of 62 mole percent of methyl methacrylate, 33 mole percent of n-butyl acrylate and 5 mole percent of acrylic acid. Similar hard, solvent-resistant coatings are obtained.

*Example 3*

Fifty parts of a 50% aqueous dispersion of an emulsion copolymer of 35 mole percent methyl methacrylate, 55 mole percent of ethyl acrylate, and 10 mole percent of acrylic acid is mixed with 10 parts of a 50% aqueous dispersion of a diglycidyl ether of Formula III in which the —$C_mH_{2m}$— group is —$CH(CH_3)CH_2$— and $z$ has an average value of 3.2. Clear coatings are obtained by applying the solution on glass, aluminum, and steel panels, drying and curing at 300° F. for 30 minutes. The coatings show good film length and resistance to ethoxyethyl acetate.

It is to be understood that changes and variations may be made without departing from the spirit and scope of the invention as defined in the appended claims.

I claim:

1. A composition comprising an aqueous dispersion containing 1 to 50% by weight of a mixture of (A) 40 to 95 parts by weight of a water-insoluble linear thermoplastic copolymer selected from the group consisting of copolymers, their ammonium salts and their salts with water-soluble monoamines, of 1 to 10 mole percent of an acid selected from the group consisting of acrylic acid and methacrylic acid and 90 to 99 mole percent of at least one alkyl ester of one of said acids in which the alkyl group has from 1 to 18 carbon atoms, and (B) 5 to 60 parts by weight of a water-dispersible aliphatic polyepoxide containing at least two vic-epoxy groups in which the epoxy oxygen atom is attached to adjacent carbon atoms.

2. A composition comprising an aqueous dispersion containing 1 to 50% by weight of a mixture of (A) 40 to 95 parts by weight of a water-insoluble linear thermoplastic copolymer selected from the group consisting of copolymers, their ammonium salts and their salts with water-soluble monoamines, of 1 to 10 mole percent of an acid selected from the group consisting of acrylic acid and methacrylic acid and 90 to 99 mole percent of at least one alkyl ester of one of said acids in which the alkyl group has from 1 to 18 carbon atoms, and (B) 5 to 60 parts by weight of a water-dispersible aliphatic polyepoxide containing at least two vic-epoxy groups in which the epoxy oxygen atom is attached to adjacent carbon atoms, the amount of polyepoxide corresponding to that which provides substantial equivalency between epoxy groups therein and carboxyl groups in the copolymer.

3. A composition comprising an aqueous dispersion containing 1 to 50% by weight of a mixture of (A) 40 to 95 parts by weight of a linear thermoplastic copolymer selected from the group consisting of copolymers, their ammonium salts and their salts with water-soluble monoamines, of 1 to 10 mole percent of an acid selected from the group consisting of acrylic acid and methacrylic acid and 90 to 99 mole percent of at least one alkyl ester of one of said acids in which the alkyl group has from 1 to 18 carbon atoms, and (B) 5 to 60 parts by weight of a water-dispersible aliphatic polyepoxide containing at least two vic-epoxy groups in which the epoxy oxygen atom is attached to adjacent carbon atoms, the amount of polyepoxide corresponding to that which provides substantial equivalency between epoxy groups therein and carboxyl groups in the copolymer and a small amount of an amine as a catalyst, the amount of amine being at least about one mole percent based on the carboxyl units of the copolymer.

4. A composition comprising an aqueous dispersion containing 1 to 50% by weight of a mixture of (A) 40 to 95 parts by weight of a linear water-insoluble thermoplastic copolymer selected from the group consisting of copolymers, their ammonium salts and their salts with water-soluble monoamines, of 1 to 10 mole percent of methacrylic acid and 90 to 99 mole percent of at least one alkyl ester of an acid selected from the group consisting of acrylic acid and methacrylic acid in which the alkyl group has from 1 to 18 carbon atoms, and (B) 5 to 60 parts by weight of a water-dispersible polyglycidyl ether of a polyhydric alcohol having 2 to 4 carbon atoms.

5. A composition as defined in claim 4 in which the alcohol is glycerol.

6. A composition comprising an aqueous dispersion containing 1 to 50% by weight of a mixture of (A) 40 to 95 parts by weight of a linear water-insoluble thermoplastic copolymer selected from the group consisting of copolymers, their ammonium salts and their salts with water-soluble monoamines, of 1 to 10 mole percent of acrylic acid and 90 to 99 mole percent of at least one alkyl ester of an acid selected from the group consisting of acrylic acid and methacrylic acid in which the alkyl group has from 1 to 18 carbon atoms, and (B) 5 to 60 parts by weight of a water-dispersible polyglycidyl ether of a polyhydric alcohol having 2 to 4 carbon atoms.

7. A composition as defined in claim 6 in which the alcohol is glycerol.

8. A composition comprising an aqueous dispersion containing 1 to 50% by weight of a mixture of (A) 40 to 95 parts by weight of a linear water-insoluble thermoplastic ammonium salt of a copolymer of about 10 mole percent of methacrylic acid, about 35 mole percent of methyl methacrylate, and about 55 mole percent of ethyl acrylate and (B) 5 to 60 parts by weight of a water-dispersible polyglycidyl ether of a polyhydric alcohol having 2 to 4 carbon atoms.

9. A composition as defined in claim 8 in which the alcohol is glycerol.

10. A composition comprising an aqueous dispersion containing 1 to 50% by weight of a mixture of (A) 40 to 95 parts by weight of a linear water-insoluble thermoplastic ammonium salt of a copolymer of about 10 mole percent of acrylic acid, about 35 mole percent of methyl methacrylate, and about 55 mole percent of ethyl acrylate and (B) 5 to 60 parts by weight of a water-dispersible polyglycidyl ether of a polyhydric alcohol having 2 to 4 carbon atoms.

11. A composition comprising an aqueous dispersion containing 1 to 50% by weight of a mixture of (A) 40 to 95 parts by weight of a linear water-insoluble thermoplastic ammonium salt of a copolymer of about 5 mole percent of acrylic acid, about 62 mole percent of methyl methacrylate, and 33 mole percent of n-butyl acrylate, and (B) 5 to 60 parts by weight of a water-dispersible polyglycidyl ether of a polyhydric alcohol having 2 to 4 carbon atoms.

References Cited in the file of this patent

UNITED STATES PATENTS

| | | |
|---|---|---|
| 2,400,333 | Bent et al. | May 14, 1946 |
| 2,607,761 | Seymour | Aug. 19, 1952 |
| 2,795,565 | Newey | June 11, 1957 |
| 2,872,427 | Schroeder | Feb. 3, 1959 |
| 2,872,428 | Schroeder | Feb. 3, 1959 |